United States Patent
Jiang et al.

(10) Patent No.: US 9,416,041 B2
(45) Date of Patent: Aug. 16, 2016

(54) METHOD FOR CUTTING SUBSTRATE OF IRREGULAR PATTERN AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Liyuan Jiang, Beijing (CN); Yaokun Zheng, Beijing (CN); Lianjie Qu, Beijing (CN); Yajie Wang, Beijing (CN); Yanqi Jiang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/347,138

(22) PCT Filed: Oct. 15, 2013

(86) PCT No.: PCT/CN2013/085208
§ 371 (c)(1),
(2) Date: Mar. 25, 2014

(87) PCT Pub. No.: WO2014/205960
PCT Pub. Date: Dec. 31, 2014

(65) Prior Publication Data
US 2015/0218033 A1 Aug. 6, 2015

(30) Foreign Application Priority Data
Jun. 26, 2013 (CN) .......................... 2013 1 0260361

(51) Int. Cl.
C03B 33/02 (2006.01)
B23K 26/36 (2014.01)
(Continued)

(52) U.S. Cl.
CPC ........... *C03B 33/0222* (2013.01); *B23K 26/364* (2015.10); *B23K 26/40* (2013.01);
(Continued)

(58) Field of Classification Search
None
See application file for complete search history.

(56) References Cited

U.S. PATENT DOCUMENTS 6,337,258 B1 * 1/2002 Nakayoshi .......... H01L 21/3043
257/E21.238
6,528,864 B1 3/2003 Arai
(Continued)

FOREIGN PATENT DOCUMENTS

CN 101101398 A 1/2008
CN 101780693 A 7/2010
(Continued)

OTHER PUBLICATIONS

Third Chinese Office Action dated Jul. 16, 2015; Appln. No. 201310260361.5.
(Continued)

*Primary Examiner* — Allan Olsen
(74) *Attorney, Agent, or Firm* — Ladas & Parry LLP

(57) ABSTRACT

A method for cutting a substrate of irregular pattern includes: forming a cutting line on the substrate, wherein the closed region enclosed by the cutting line is the irregular pattern that is required; forming a trough line at the cutting line; and applying an external force to the substrate so as to divide the substrate at the trough line. The method can remarkably improve accuracy and efficiency of cutting a substrate of irregular pattern.

10 Claims, 3 Drawing Sheets

(51) Int. Cl.
*C03C 15/00* (2006.01)
*B26F 3/00* (2006.01)
*C03B 33/07* (2006.01)
*B23K 26/40* (2014.01)
*C03B 33/04* (2006.01)

(52) U.S. Cl.
CPC .............. *B26F 3/002* (2013.01); *C03B 33/074* (2013.01); *C03C 15/00* (2013.01); *B23K 2203/50* (2015.10); *C03B 33/04* (2013.01); *Y10T 29/49996* (2015.01); *Y10T 225/12* (2015.04)

(56) References Cited

U.S. PATENT DOCUMENTS

| | | | | |
|---|---|---|---|---|
| 2004/0010910 | A1* | 1/2004 | Farrell | H01L 21/50 29/830 |
| 2004/0187659 | A1 | 9/2004 | Nishiyama | |
| 2005/0266680 | A1* | 12/2005 | Daskal | A61B 17/3211 438/637 |
| 2007/0075320 | A1* | 4/2007 | Hata | B82Y 20/00 257/79 |
| 2007/0190747 | A1* | 8/2007 | Humpston | B81C 1/00285 438/460 |
| 2008/0179547 | A1* | 7/2008 | Henley | H01L 21/76254 250/492.21 |
| 2009/0045486 | A1 | 2/2009 | Kohda | |
| 2009/0303191 | A1* | 12/2009 | Yang | G06F 3/045 345/173 |
| 2010/0003421 | A1* | 1/2010 | Ebels | B81C 99/0085 427/532 |
| 2010/0243623 | A1 | 9/2010 | Lee et al. | |
| 2011/0194063 | A1* | 8/2011 | Lee | G02F 1/1333 349/153 |
| 2012/0251800 | A1* | 10/2012 | Nakayama | G06F 3/044 428/210 |
| 2013/0091747 | A1* | 4/2013 | Ashpole | B42D 15/02 40/124.01 |
| 2014/0203687 | A1* | 7/2014 | Stegmeier | B06B 1/0629 310/334 |
| 2014/0232006 | A1* | 8/2014 | Vielemeyer | H01L 23/48 257/773 |
| 2015/0069394 | A1* | 3/2015 | Zundel | H01L 22/12 257/48 |

FOREIGN PATENT DOCUMENTS

| | | |
|---|---|---|
| CN | 101844275 A | 9/2010 |
| CN | 202247006 U | 5/2012 |
| CN | 103078011 A | 5/2013 |
| CN | 103123562 A | 5/2013 |
| CN | 103341692 A | 10/2013 |
| CN | 14347138 A | 3/2014 |
| GB | 1398940 | 6/1975 |
| JP | 2009-032971 A | 2/2009 |
| JP | 2013-062526 A | 4/2013 |
| JP | 02132844 A | 3/2014 |
| KR | 100934012 B1 | 12/2009 |

OTHER PUBLICATIONS

First Chinese Office Action Appln. No. 201310260361.5; Dated Sep. 19, 2014.
InternationalSearch Report mailed Mar. 4, 2014; PCT/CN2013/085208.
Second Chinese Office Action dated Feb. 13, 2015; Appln. No. 201310260361.5.
International Preliminary Report on Patentability issued Dec. 29, 2015; PCT/CN2013/085208.

* cited by examiner

METHOD FOR CUTTING SUBSTRATE OF IRREGULAR PATTERN AND DISPLAY DEVICE

TECHNICAL FIELD

Embodiment of the present invention relates to a method for cutting a substrate of irregular pattern and to a display device.

BACKGROUND

A base substrate is one of the essential elements constituting a display screen, a touch screen etc. For the purpose of obtaining a display of a desired shape and dimension, a cutting process is commonly required to obtain a base substrate of a shape and dimension consistent with that of the display. Moreover the quality of the base substrate directly determines the manufacturing costs and the market value of such a display.

A conventional display is of a regular shape, and commonly a rectangular shape. The method for cutting a base substrate in traditional techniques is that: inputting the required shape and dimension into a numerical control machine tool, and then controlling a cutter wheel so as to cut out every edge of the regular pattern successively.

Along with the rapid development of the display industry, consumer demands also become diversified gradually, and such displays of irregular pattern are also desired. When the cutting method in traditional techniques is used for cutting a base substrate of irregular pattern, ifs necessary to perform cutting for several times to cut out each edge of the irregular pattern, which causes great cumulative error, lower cutting accuracy, and very low cutting efficiency.

SUMMARY

One aspect of the present invention provides method for cutting a substrate of irregular pattern, comprising: forming a cutting line on the substrate, wherein a closed zone enclosed by the cutting line is the irregular pattern that is required; forming a trough line at the cutting line; and applying an external force to the substrate so as to divide the substrate at the trough line.

At the same time, another aspect of the present invention also provides a display device, and the substrate thereof is fabricated using the above method for cutting a substrate of irregular pattern.

With the method for cutting a substrate of irregular pattern provided by the embodiment of present invention, it's possible to improve the accuracy and efficiency in cutting a substrate of irregular pattern so as to provide a substrate of irregular pattern for the display devices, and further, this method can allow a high production efficiency and is suitable for mass production.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Further detailed description is made for the specific embodiments of the present invention below in conjunction with the attached drawings and examples. The following embodiments are used for illustrating the present invention but not for limiting the scope of the present invention.

Embodiment 1

For display devices comprising a display of irregular pattern, when the base substrate thereof is cut by using the method for cutting a base substrate of regular pattern, that is to say, inputting the desired shape and dimension into a numerical control machine tool and then controlling a cutter wheel to cut out every edge of the irregular pattern successively, it's possible to give rise to the problems, such as great cumulative error, extremely low cutting accuracy and efficiency. This embodiment provides a method for cutting a substrate of irregular pattern for improving accuracy and efficiency in cutting a substrate of irregular pattern.

Figure 1:
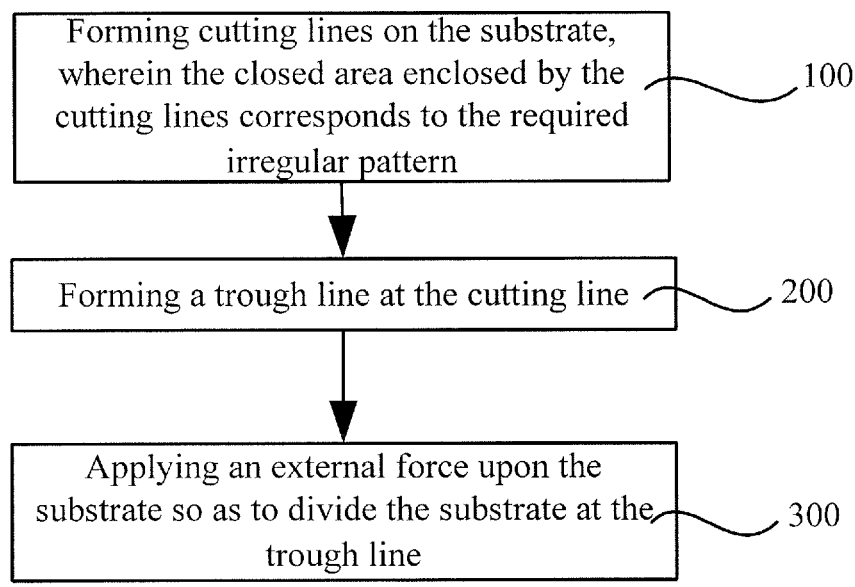
FIG. 1 is a flow chart illustrating the method for cutting a substrate of irregular pattern according to an embodiment of present invention.

As shown in FIG. 1, the method for cutting a substrate of irregular pattern in this embodiment comprises the following steps 100-300.

Step 100: forming a cutting line on the substrate, wherein a closed region enclosed by the cutting line is the irregular pattern that is required.

It's possible to remarkably improve the accuracy and efficiency for cutting the substrate by first forming a cutting line, which encloses a closed region corresponding to the required irregular pattern, on the substrate so as to marking out the cutting line in advance.

Figure 2:
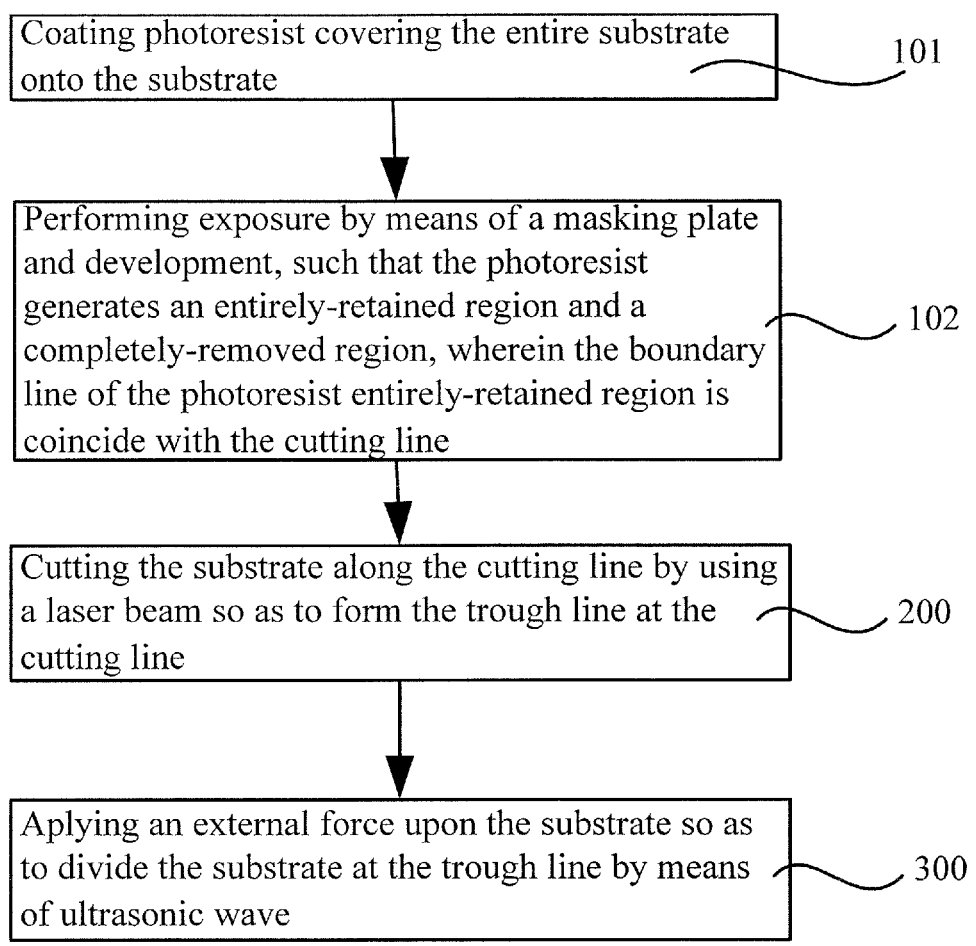
FIG. 2 is a flow chart illustrating an example of the method for cutting a substrate of irregular pattern according to an embodiment of present invention.
Figure 3:
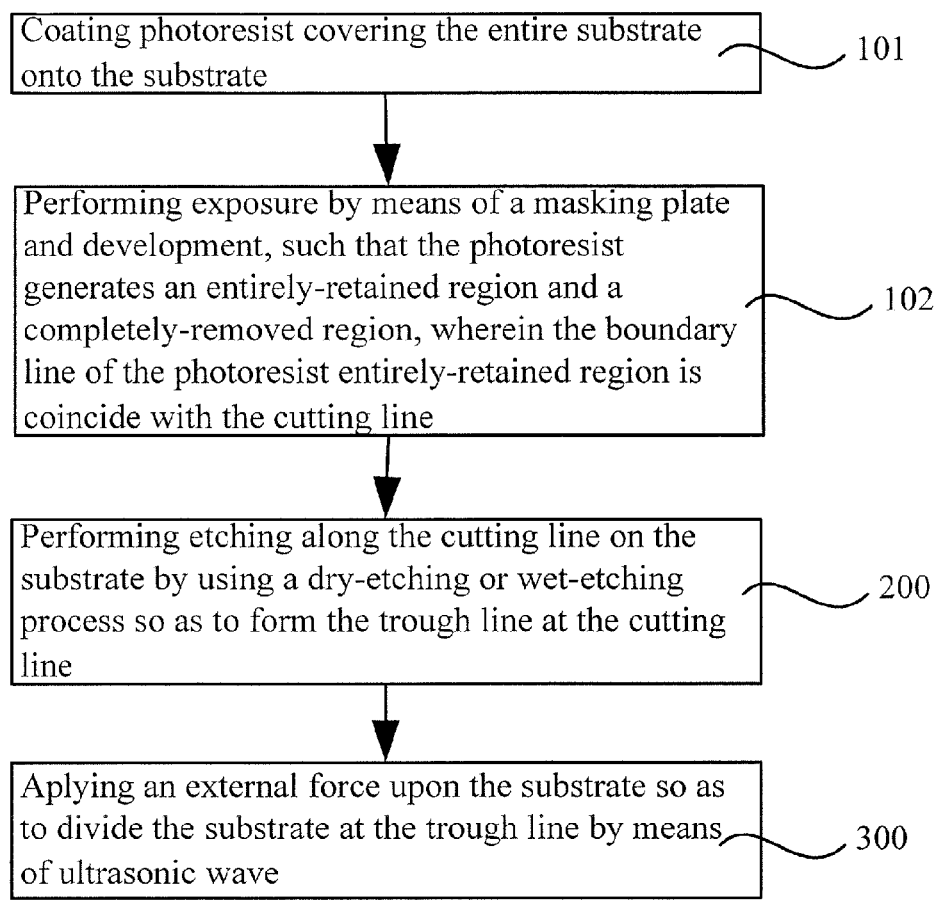
FIG. 3 is a flow chart illustrating another example of the method for cutting a substrate of irregular pattern according to an embodiment of present invention.

In order that the formed cutting line possesses an improved accuracy, as shown in FIGS. 2 and 3, one example for this step comprises the following steps 101-102.

Step 101: Coating photoresist covering the entire substrate onto the substrate.

The photoresist may be positive photoresist or negative photoresist. Description is made below by taking the positive photoresist as an example, namely, after exposure and development of the photoresist, the photoresist entirely-retained region corresponds a portion of the substrate comprising the desired irregular pattern, and acts to protect the substrate during cutting of the substrate. Coating of photoresist may be performed by many methods, such as spin, blade coating etc.

Step 102: Performing exposure by means of a mask plate and development, such that the photoresist generates an entirely-retained region and a completely-removed region, wherein the boundary line of the photoresist entirely-retained region is coincide with the cutting line, for example, the photoresist completely-removed region (the concave region in the photoresist layer) corresponds to the cutting line.

Such a mask plate comprises pattern corresponding to the desired irregular pattern, so that the photoresist, after the exposure and development, comprises a pattern corresponding to the desired irregular pattern, the photoresist pattern constituted by the photoresist entirely-retained region indicates the cutting line.

Step 200: Forming a trough line at the cutting line.

However, since the base substrate is commonly thick, when the substrate is divided directly along the cutting line indicated by the photoresist pattern, a longer cutting time will be needed. With the step of pre-forming a trough line at the cutting line, it's possible to improve efficiency of cutting.

There are many ways for creating a trough line at the cutting line, for example, cutting on substrate using a laser-beam cutter along the cutting line so as to create a trough line at the cutting line, the flow chart for this method is shown in FIG. 2. For example, the laser source may employ a carbon dioxide laser beam, and the operating power thereof is between 500 W to 2500 W. Or, it's also possible to perform etching on the substrate along the cutting line through a dry-etching or wet-etching process, so as to create a trough line at the cutting line, the flow chart for this method is shown in FIG. 3. Diamond or other hard alloy may also be used to perform cutting on the substrate along the cutting line, so as to create a trough line at the cutting line, and all of the methods fall into the protection scope of the present invention.

In practice, the wet-etching process generally employs hydrofluoric acid of a mass concentration between 10%-40%, since hydrofluoric acid is capable of dissolving materials, such as glass and quartz, which are unsolvable for many other kinds of acid. The base substrate of the display device, however, is commonly a glass substrate or a quartz substrate. A dry-etching process generally employs sulfur hexafluoride gas, helium gas or argon gas, because those gases belong to inert gas, and are only used to strike out the molecules of the base substrate by means of ion-bombardment so as to create a trough line without corrupting the base substrate.

After finishing this step, the remained photoresist can be stripped off, thus forming a substrate of the desired irregular pattern.

Step 300: Applying an external force onto the substrate so as to divide the substrate at the trough line.

As shown in FIGS. 2 and 3, in this embodiment, the external force is applied onto the substrate through, for example, ultrasonic wave, thereby divide the substrate at the trough line. The ultrasonic wave can not only generate a slim broken layer, but also carry out processing of the broken surface simultaneously, thereby reducing subsequent burden for the subsequent corner-trimming and/or edge-grinding processes.

For example, the frequency range for the ultrasonic wave is generally between 20 KHz-500 MHz. Within such a frequency range, it's possible to ensure the substrate be divided along pre-set trough line, and at the same time, other regions of the substrate would not be affected in their integrity.

Embodiment 2

This embodiment provides a display device, the substrate thereof is made by using the method for cutting an irregular pattern in embodiment 1, so that the embodiment provides a substrate of irregular pattern with high precision and high production efficiency for the display device and is suitable for mass production and thus satisfies the demands from consumers.

As can be seen from the above embodiments, in the method for cutting a substrate of irregular pattern provided by the embodiment of present invention, a cutting line is firstly formed on the substrate, and the closed region enclosed by the cutting line is the required irregular pattern, which can improve the accuracy for cutting the substrate; and next, a trough line is created at the cutting line, it's thus possible to shorten the time for cutting the substrate and improve the efficiency in cutting the substrate. As a result, a substrate of irregular pattern with high precision and high production efficiency is provided for the display device, and it is suitable for mass production. For example, the mask-exposure technology may be used to form the cutting line on the substrate, so as to improve accuracy of the cutting line and further improve the accuracy in cutting the substrate. Finally, the ultrasonic wave is used to apply an external force to the substrate so that the substrate is divided at the trough line, since the ultrasonic wave can not only generate a slim broken layer, but also carry out processing of the broken surface simultaneously, it's possible to reduce subsequent burden for the corner-trimming and/or edge-grinding processes.

All the above description are only preferred embodiments of the present invention, it should be noted that several improvements and alternations also can be made by those skilled in this art without departing from the technical principle of the present invention, and all such improvements and alternations should be considered as the protection scope of the present invention.

The invention claimed is:

1. A method for cutting a substrate of irregular pattern, comprising:
    forming a cutting line on the substrate, wherein a closed region enclosed by the cutting line is the irregular pattern that is required;
    forming a trough line at the cutting line through an etching process; and
    applying an external force onto the substrate so as to divide the substrate at the trough line, wherein the external force is applied on the substrate through ultrasonic wave to cut the substrate at the trough line formed by the etching process.

2. The method for cutting a substrate of irregular pattern according to claim 1, wherein forming of the cutting line on the substrate comprises:
    coating the substrate with photoresist to cover the entire substrate;
    performing exposure by means of a mask plate and development, such that the photoresist generates an entirely-retained region and a completely-removed region, wherein a boundary line of the photoresist entirely-retained region coincides with the cutting line.

3. The method for cutting a substrate of irregular pattern according to claim 2, wherein forming a trough line at the cutting line comprises:
    performing etching along the cutting line on the substrate by using a dry-etching or wet-etching process so as to form the trough line at the cutting line.

4. The method for cutting a substrate of irregular pattern according to claim 3, wherein performing etching along the cutting line on the substrate by using a dry-etching process comprises:
    performing etching along the cutting line on the substrate by using sulfur hexafluoride gas, helium gas or argon gas.

5. The method for cutting a substrate of irregular pattern according to claim 3, wherein performing etching along the cutting line on the substrate by using a wet-etching process comprises:
    performing etching along the cutting line on the substrate by using hydrofluoric acid.

6. The method for cutting a substrate of irregular pattern according to claim 1, wherein forming a trough line at the cutting line through an etching process comprises:
    performing etching along the cutting line on the substrate by using a dry-etching or wet-etching process so as to form the trough line at the cutting line.

7. The method for cutting a substrate of irregular pattern according to claim 6, wherein performing etching along the cutting line on the substrate by using a dry-etching process comprises:

performing etching along the cutting line on the substrate by using sulfur hexafluoride gas, helium gas or argon gas.

8. The method for cutting a substrate of irregular pattern according to claim 6, wherein performing etching along the cutting line on the substrate by using a wet-etching process comprises:

performing etching along the cutting line on the substrate by using hydrofluoric acid.

9. The method for cutting a substrate of irregular pattern according to claim 1, wherein a frequency range for the ultrasonic wave is between 20 KHz to 500 MHz.

10. The method for cutting a substrate of irregular pattern according to claim 1, after applying an external force on the substrate so as to divide the substrate at the trough line, further comprising:

performing corner-trimming and/or edge-grinding process on the edge of the substrate comprising the desired irregular pattern.

* * * * *